W. E. WILSON.

FIREPROOF BUILDING WALL.

APPLICATION FILED OCT. 26, 1916.

Reissued Dec. 18, 1917. 14 414.

Witnesses:
W. P. Kilroy
Sebastian Hinton

Inventor:
Wilham E. Wilson
By Walter R. Lane
Atty

UNITED STATES PATENT OFFICE.

WILLIAM E. WILSON, OF MASON CITY, IOWA.

FIREPROOF BUILDING-WALL.

14,414. Specification of Reissued Letters Patent. Reissued Dec. 18, 1917.

Original No. 1,171,913, dated February 15, 1916, Serial No. 838,061, filed May 12, 1914. Application for reissue filed October 26, 1916. Serial No. 127,947.

*To all whom it may concern:*

Be it known that I, WILLIAM E. WILSON, a citizen of the United States, resident of Mason City, county of Cerro Gordo, and State of Iowa, have invented certain new and useful Improvements in Fireproof Building Walls, of which the following is a specification.

My invention relates to a fire-proof building wall and the object of the invention is to hermetically seal both the horizontal and vertical joint between the blocks comprising the wall, to the end that the passage of heated or cold air through the joints in the wall will be prevented, and particularly to prevent the passage of heat through the wall and to prevent the surface conduction of moisture therethrough by incorporating in the wall insulating material which will render such passage and conduction impossible.

A further object is to provide a wall construction which will be simple and economical and at the same time thoroughly insulate the building against frost and heat.

The invention consists generally in various constructions and combinations, all as hereinafter described and particularly pointed out in the claims.

Figure 1:
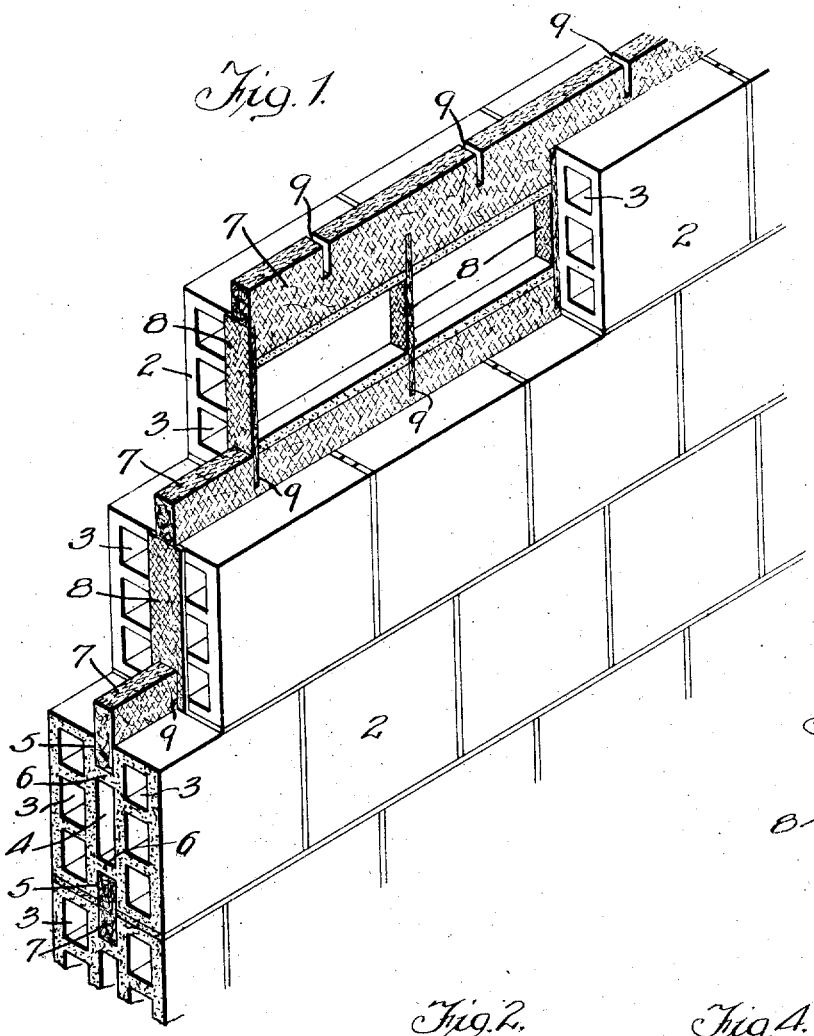
Figure 5:
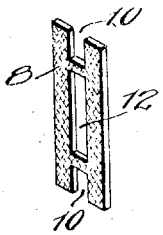
Figure 6:
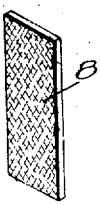
Figure 3:
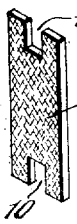
Figure 2:
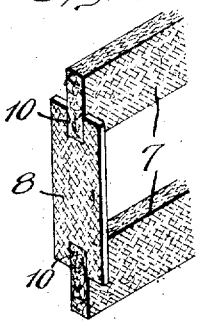
Figure 4:
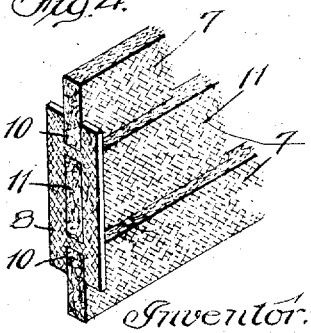

In the accompanying drawings forming part of this specification, Figure 1 is a perspective view of a wall with my invention applied thereto; Fig. 2 is a perspective view, showing the longitudinal and vertical insulating pads in their assembled position, Fig. 3 is a perspective view of the form of vertical pad shown in Fig. 2; Fig. 4 is a perspective view, showing a longitudinal pad adapted to fit within the central opening in the block and extending through the vertical pad between the blocks; Fig. 5 is a perspective view of the form of vertical pad used with the arrangement of Fig. 4; Fig. 6 is a perspective view of the form of vertical pad used in Fig. 1.

In the drawing, 2 represents the blocks of which the wall is composed. As shown, these blocks are provided with a series of longitudinal openings 3 on each side of the vertical middle portion of the block, forming, when the blocks are placed in courses in the wall, a series of passages running horizontally through the wall and having the function, as usual in blocks of this kind, of preventing the passage of moisture from one surface of the wall to the other. I have shown three of these passages on each side of the block, but a greater number may be employed according to the preferred size and shape of the block. 4 is a central passage running through the block from end to end, and above and below these passages are longitudinal recesses 5 separated from the central passage by walls 6. These recesses are of suitable depth and preferably corresponding in width to the central opening 4, and when the blocks are laid in courses the recesses in the blocks of the same course will be in alinement with one another and form continuous passages in the joints of the blocks, from one end of the wall to the other. In these passages I place horizontal insulating strips or pads 7 of suitable width to lap the horizontal joints between blocks of adjacent courses so that the upper portion of a pad will be in the recess in the bottom of one course, while the lower portion of the same pad will lie in the upper part of the blocks in the course next beneath, thereby bridging the horizontal joint between the courses and positively preventing the passage of heat and cold through this joint. In connection with this horizontal pad I prefer to use a vertical pad 8 of greater width than the central opening, and closing the ends thereof at each end of a block, and of less width than the thickness of a block and of sufficient length to cover the central opening from the top to the bottom thereof, thereby sealing this passage and forming a dead air chamber in each block. This pad is also made of insulating material and positively prevents the passage of heat or cold through the joint. To combine this vertical pad with the horizontal one I prefer to provide transverse slits 9 arranged at intervals in the upper and lower edges of the horizontal pad and in staggered relation to one another, and extending partially therethrough, and of sufficient width to receive the ends of the vertical pad and coöperate therewith to positively close the horizontal and vertical joints and thoroughly insulate one side of the wall from the other.

Instead of cutting notches or slits in the longitudinal pads I may provide notches 10 in the ends of the vertical pad 8 of sufficient depth to receive the edges of the adjacent longitudinal pads to interlock therewith, the result being the same as slitting the longitudinal pads and inserting the vertical pads in these slits.

I may also provide insulating pads 11, shown in Fig. 4, adapted to fit within the central openings 4 in the blocks and extend through these openings from end to end of the blocks and abut at each end against the vertical pads, or slots 12 may be provided in these vertical pads and the pads 11 be in the form of continuous ones running through the blocks of each course and fitting within the slots in the vertical pads. With this arrangement of the horizontal pads above and below the blocks and extending through the central openings therein, the insulation will be substantially continuous from the top to the bottom of the wall, there being only a comparatively shallow wall or partition separating the central opening from the horizontal pads immediately above and below it.

The wall is adapted not only for dwelling house construction, but is also used in silo construction, where a complete insulation against the passage of heat or cold through the wall is desirable.

Having now described my invention, I claim:—

1. A wall composed of a series of blocks, each having a central opening extending through the block from end to end thereof, and each having a longitudinal, independent opening extending from end to end of the block, on each side of said central opening, each block having longitudinal, centrally arranged recesses above and below its central opening, vertical insulating pads inserted between the abutting ends of the blocks in the same course, horizontal pads fitting within the recesses in said blocks and interlocking with the ends of said vertical pads at their point of intersection, said vertical and horizontal pads closing the vertical and horizontal joints in said wall.

2. A wall composed of a series of blocks, each having a central opening extending through the block from end to end thereof and each having a longitudinal, independent opening extending from end to end of the block on each side of said central opening, each block having longitudinal, centrally arranged recesses above and below its central opening, insulating pads inserted between the abutting ends of the blocks in the same course, horizontal pads fitting within said central openings and extending lengthwise thereof, similar pads fitting within the recesses in said blocks and interlocking with the ends of said vertical pads at their points of intersection, said vertical and horizontal pads closing the vertical and horizontal joints in said wall and insulating said walls and joints against the passage of heat and cold.

3. A wall composed of a series of blocks, each having a central opening extending through the block from end to end thereof and each having a longitudinal, independent opening extending from end to end of the block on each side of said central opening, each block having longitudinal, centrally arranged recesses above and below its central opening, vertical insulating pads inserted between the abutting ends of the blocks in the same course and having centrally arranged slots to register with the ends of said central openings, horizontal pads fitting within the recesses in said blocks and interlocking with the ends of said vertical pads at their points of intersection and similar horizontal pads passing through said central openings and through the central slots in said vertical pads, said longitudinal and vertical pads insulating said walls and joints against the passage of heat and cold.

4. In a wall, in combination, a series of rectangular blocks each of which is provided with one or more openings in each side thereof, the top and bottom portions of each of said blocks each being formed with a longitudinal groove therein, said grooves lying between the openings in the sides of the block, and a longitudinal strip of insulating material lying in said grooves, whereby to prevent the passage of heat and moisture across the wall.

5. A wall composed of a series of rectangular building blocks each having one or more openings in each side thereof and a longitudinal groove in each of the top and bottom portions thereof intermediate said openings, and a longitudinal pad of insulating material lying in said grooves and connecting adjacent tiles whereby to prevent the passage of heat and moisture across the wall.

6. A wall composed of a series of rectangular building blocks having one or more openings in each side thereof, and a central opening extending through the block between said first mentioned openings, the top and bottom portions of each of said blocks each being formed with a longitudinal groove lying between the openings in the sides of the blocks, and a longitudinal strip of insulating material lying in said grooves and connecting adjacent tiles, whereby to prevent the passage of heat and moisture across the wall.

In witness whereof, I have hereunto subscribed my name to this specification in the presence of two witnesses.

WM. E. WILSON.

Witnesses:
J. S. MacManus,
S. L. Taylor.